United States Patent [19]

Roberts

[11] Patent Number: 5,299,376
[45] Date of Patent: Apr. 5, 1994

[54] ELECTRONIC SCRAPE DRIP

[76] Inventor: Benton A. Roberts, Rte. 2, Box 1660, Kyle, Tex. 78640

[21] Appl. No.: 968,282

[22] Filed: Oct. 29, 1992

[51] Int. Cl.⁵ .............................................. A01M 31/06
[52] U.S. Cl. .................................................... 43/2; 43/1; 222/510; 239/43
[58] Field of Search ................ 43/1, 2; 222/504, 650, 222/510, 638; 239/37, 43, 70, 74

[56] References Cited

U.S. PATENT DOCUMENTS

| | | | |
|---|---|---|---|
| 908,508 | 1/1909 | Sholes | 239/43 |
| 2,652,175 | 9/1953 | Davis | 222/510 |
| 2,959,354 | 11/1960 | Beck | 239/36 |
| 3,046,192 | 7/1962 | Bilyeu | |
| 3,119,650 | 1/1964 | Bilyeu | |
| 3,371,652 | 3/1968 | Louks | 222/650 |
| 3,580,504 | 5/1971 | Benham | 239/70 |
| 4,302,899 | 12/1981 | DeHart | 43/1 |
| 4,609,245 | 9/1986 | Sakschek | 43/1 |
| 4,628,960 | 12/1986 | Brickell | 239/74 |
| 4,667,430 | 5/1987 | Ziese | 119/29 |
| 4,773,177 | 9/1988 | Gray, II et al. | 43/1 |
| 4,944,940 | 7/1990 | Christenson, II | 424/84 |
| 4,953,763 | 9/1990 | Kierum et al. | 43/1 |
| 5,035,435 | 7/1991 | Burgeson | 239/34 |
| 5,060,411 | 10/1991 | Uhlman | 43/1 |
| 5,137,187 | 8/1992 | Nichols | 222/504 |

OTHER PUBLICATIONS

Drip-U-Lator—Flow-Rite of Tennessee, 107 Allen Street, Bruceton, Tenn. 38317, 1-800-374-6965—Buckmasters Whitetail Mag., Oct. 1992, p. 10.

Primary Examiner—Paula A. Bradley
Assistant Examiner—James Miner

[57] ABSTRACT

A buck lure dispensing device for dispensing a fluid animal scent is disclosed which includes a housing, a reservoir within the housing for containing the animal scent, a valve assembly for controlling flow of the animal scent out of the reservoir, and a timer. The device further includes a tubular member extending from the bottom of the reservoir and an absorbent wick mounted at the bottom of the tube. The device allows gradual and controlled emission of animal scent into the surrounding air.

6 Claims, 4 Drawing Sheets

ELECTRONIC SCRAPE DRIP

FIELD OF INVENTION

The present invention relates generally to a fluid dispensing device for fluid type buck lures.

DESCRIPTION OF PRIOR ART

As hunters have known for years, deer can be lured in several ways. Food, sex, and curiosity are common ways of luring deer into an area.

As the more experienced hunters have learned throughout the years, food and curiosity will lure in most deer. But seldom will it lure in the most elusive bucks in the area. These bucks may become nocturnal and seldom seen by the hunter until the breeding season or "The Rut" when the bucks will start following receptive does out into the open for the purpose of breeding them.

In recent years, hunters have learned about "Scrapes", being where a buck will paw out a small circular area in the dirt and urinate in it. The buck will leave several scrapes in his territory for the purpose of luring receptive does to the area. A doe will find these scrapes and if she is in a receptive state, she will urinate in the scrapes. The buck will scent check the scrapes on a regular basis. Upon finding that the scrape has been annointed by a doe, the buck will trail the receptive doe with the intentions of breeding her.

Hunters have discovered that hunting over these scrapes, greatly increase the hunters chance of intersecting the dominate buck. Hunters can use commercially available buck lure to add to a scrape to keep it freshened. Hunters can douse the scrape with buck lure or by using a buck lure dispenser that is placed several feet above the scrape from a tree limb allowing the dispenser to drip fluid into the scrape.

As of this date the only known lure dispensers are self dripping and are virtually uncontrollable. Due to the cost of commercially obtained buck lure, one would prefer to use it more conservatively. Due to this situation, the need has arisen for a hunter controlled lure dispenser in which the fluid discharge time could be set and thus drip only enough buck lure to keep the scrape freshened. Several more advantages would be obtained with the present invention, one being that buck lure would last much longer and the hunter would not be required to refill the lure dispenser so frequently.

SUMMARY OF THE INVENTION

It is therefore an object of the present invention to overcome the problems of the prior art lure dispensers. To begin with the object of this invention is to allow the hunter to set the time of fluid discharge. With the buck scrape being annointed in this way, it would give a more realistic appearance of a doe visiting the scrape.

It is another object of the invention to allow the hunter to use the expensive buck lure more conservatively in that the lure dispenser can be used for approximately two weeks before refilling.

It is further an object of the present invention to eliminate the need for the hunter to contaminate the scrape area with human scent due to frequent visits to the scrape to refill the lure dispenser of the prior art.

The present invention comprises in general a fluid receptacle, a needle and seat mounted inside of the fluid receptacle, a solenoid attached to the needle, an electronic timing circuit powered by a 9 volt battery, a clock which is used to set the time for a fluid discharge from fluid receptacle and a plastic box which will contain the before mentioned components of the lure dispenser.

The present invention was designed and developed to be suspended from a tree branch over a buck scrape. The hunter can set the times in which he wants the scrape to be annointed. When the preset time arrives, a magnet mounted on the face of the clock, will turn on a switch which activates a solenoid. The solenoid, being attache& to the needle, will lift the needle from the seat and allow the buck lure to drip out of fluid receptacle. As the fluid drips from the fluid receptacle, the fluid is contained temporarily in a wick tube attached to the bottom of fluid receptacle. The wick tube consists of a plastic tube with an absorbent wick protruding from the end of the tube, which will soak up the buck lure and allow the buck lure to begin to drip onto the scrape below. The fluid discharge cycle will last for approximately three seconds, this three second cycle is initiated by the electronic timing circuit.

By virtue of the present invention, the hunter has the capability of controlling the quanity of buck lure that is used to freshen the scrape. This capability makes the present lure dispenser more economical to use.

One will see the advantages of the present invention in the details of the following disclosure.

BRIEF DESCRIPTION OF THE DRAWINGS

Objects and advantages will become apparent upon the study of the following specification and the accompanying drawings.

FIG. 3A shows an enlarged view of the unique needle and seat system of the present invention.

DETAILED DISCLOSURE OF THE INVENTION

Figure 1:
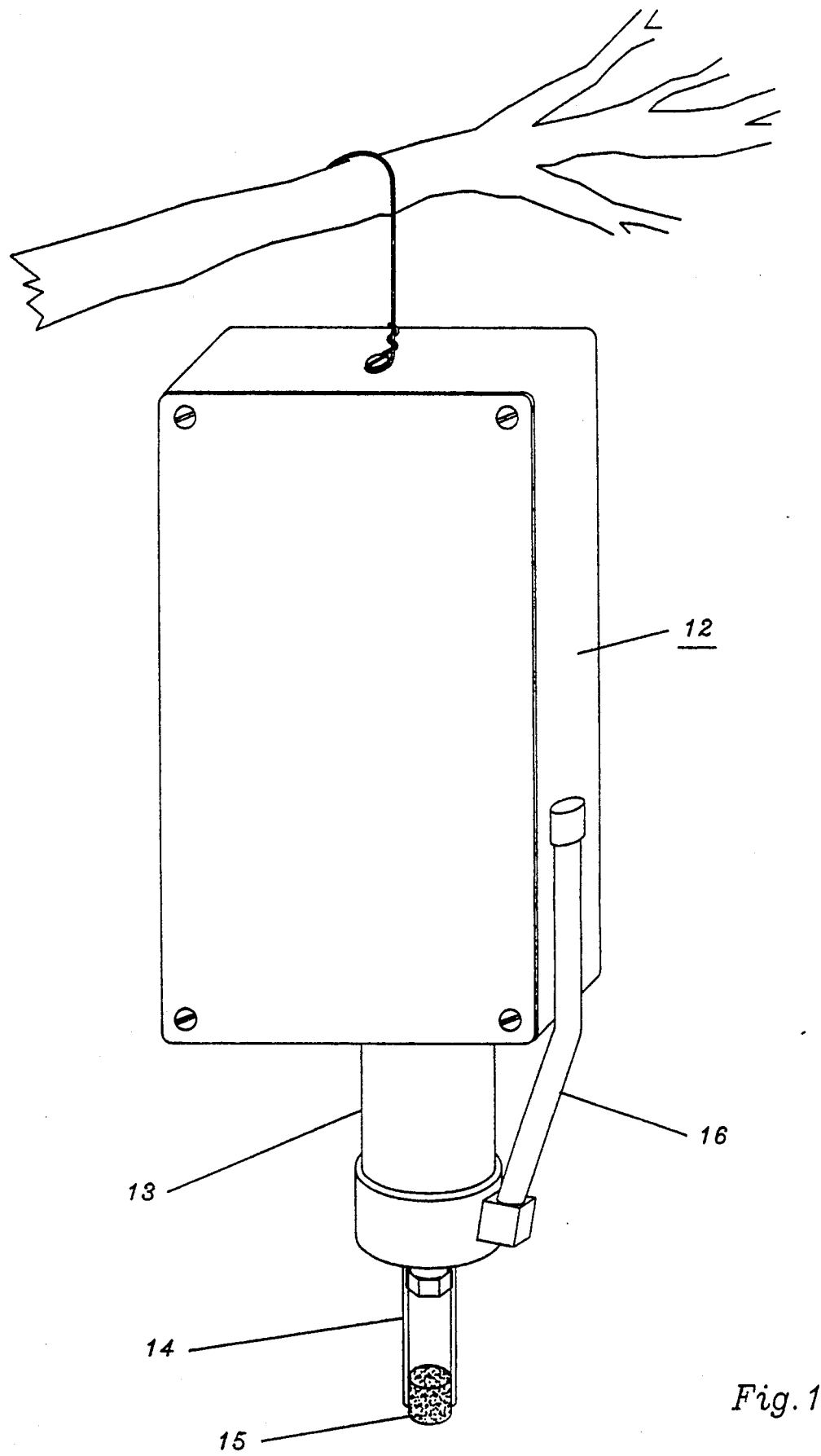
FIG. 1 is a perspective view of the present invention in its intended environment.
Figure 2:
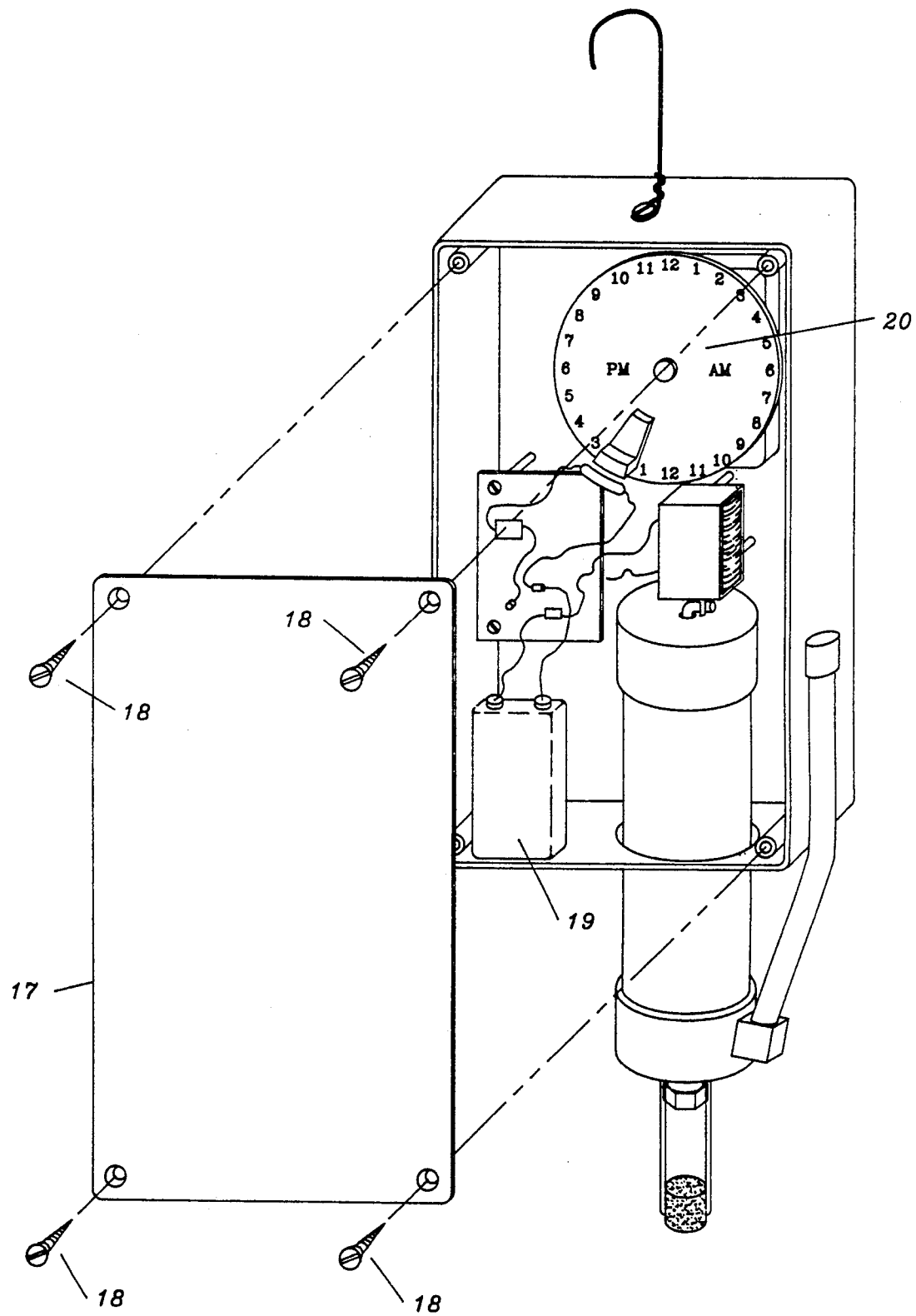
FIG. 2 is the present lure dispenser showing the front closure means and attaching hardware.
Figure 3:
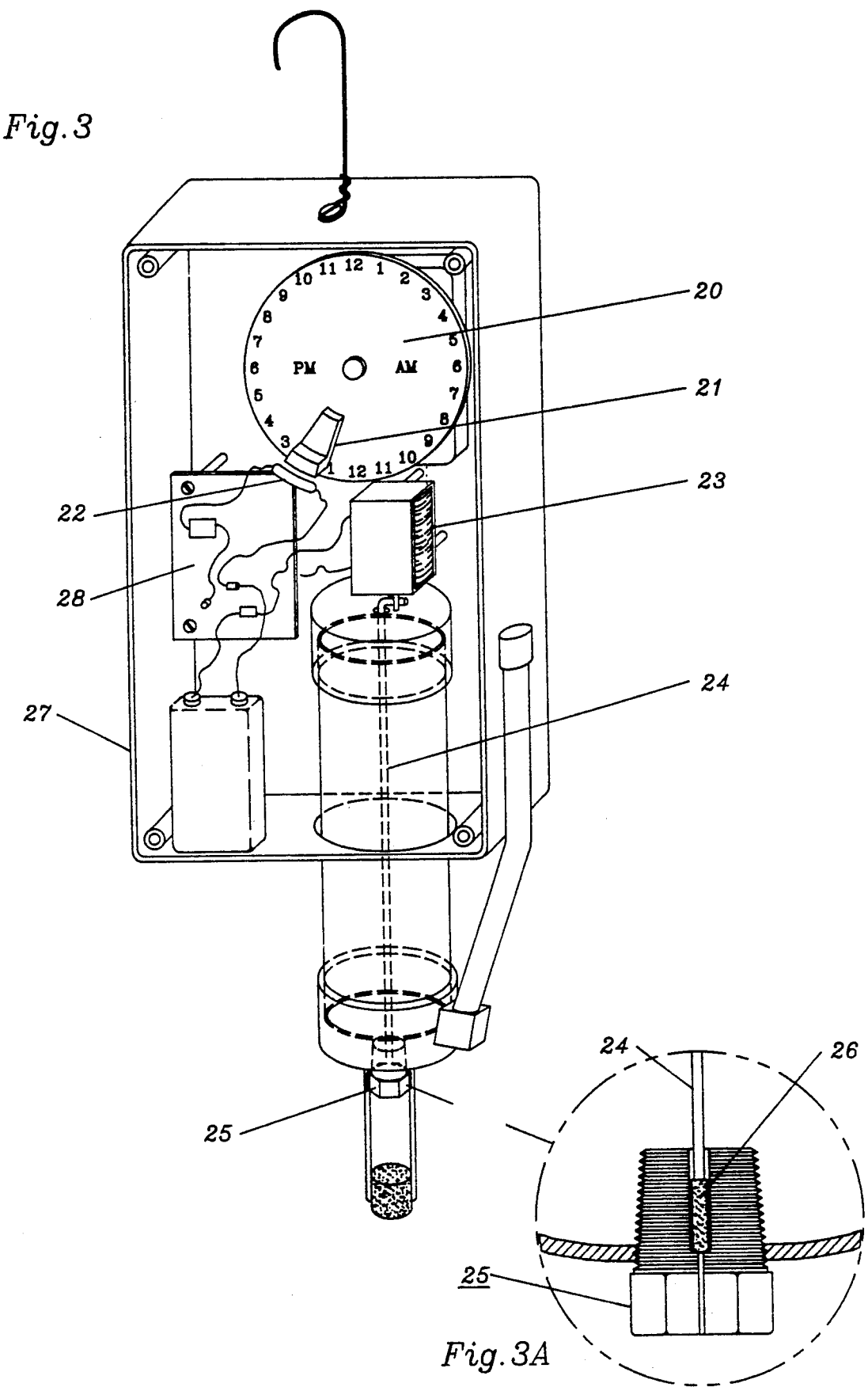
FIG. 3 is an open front view of the present lure dispenser showing the components within the housing, also showing a fluid level gauge and a wick apperatus.
Figure 4:
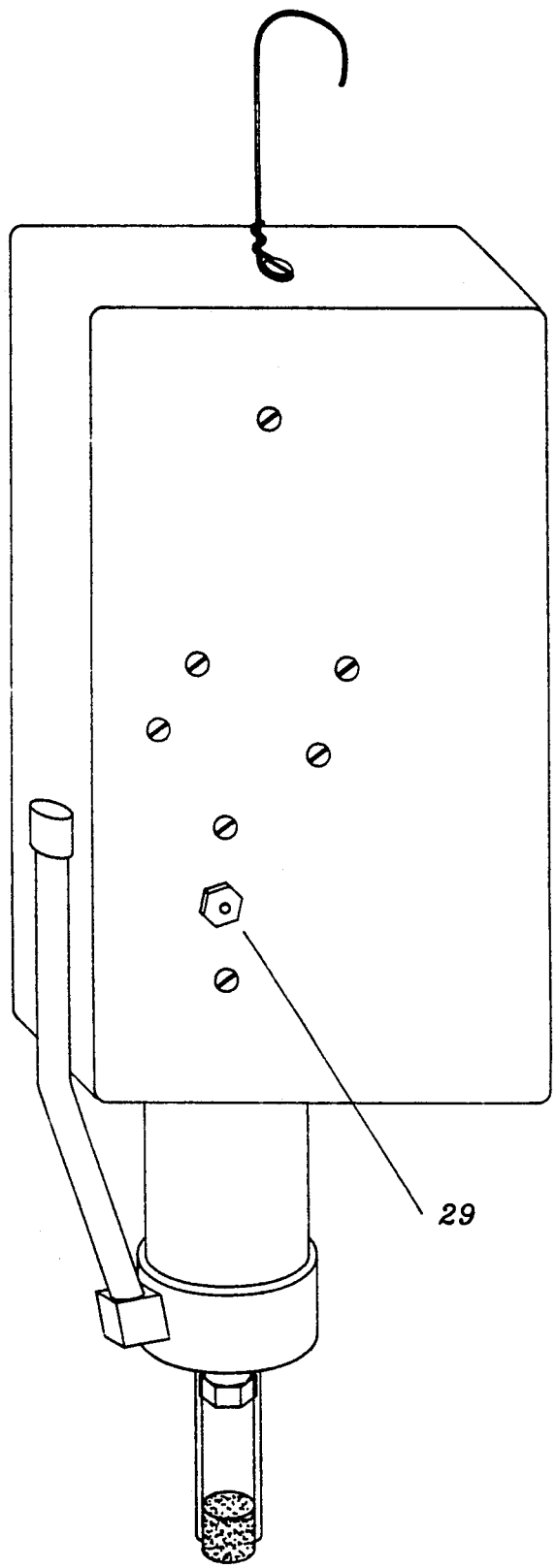
FIG. 4 is a rear view of the present lure dispenser showing a fill plug which also serves as a vent for the fluid receptacle.

As can be seen in the drawings, the lure dispenser of the present invention is designated generally by the reference number 12. The lure dispenser apperatus (12) consist in general of a plastic inclosure (27) which contains the components of the lure dispenser. The lure dispenser hangs from a tree branch above either a mock scrape or an existing scrape. The fluid receptacle (13) of the lure dispenser (12) protrudes through the bottom of the plastic enclosure (27). Extending from the bottom of the fluid receptacle or reservoir (13) is a wick (14) which consist of a plastic tube with an absorbent type wick (15) protruding from it. As fluid discharges from fluid receptacle (13) passed needle (24) and seat (25), fluid is caught inside of the plastic tube (14) and held there for a few seconds until fluid soaks through wick (15) and drips to the ground. With wick (15) remaining damp, this will keep buck lure scent airborne to help attract bucks to the scrape.

A fluid level gauge (16) protrudes from lower side of fluid receptacle (13), will show remaining fluid at a glance. The front closure means (17) which is secured to the enclosure (27) by means of four screws (18), provides easy access to change battery (19) or set time on clock (20) for fluid discharge. Fluid discharge is set by means of placing one or more magnetic indicators (21) on clock (20) according to the time that the hunter wants the scrape to be annointed. As clock (20) carries the magnetic indicator (21) around to a preset time, the magnetic indicator (21) will close contacts on switch (22). Switch (22) will activate solenoid (23) and lift needle (24) from seat (25) to discharge buck lure into wick (14). Fluid discharge rate is approxiamatly three seconds which is initiated by electronic timing circuit (28).

The needle (24) and seat (25), mentioned before in this disclosure, is a very unique part of the lure dispenser (12) in that with seal (26) attached to needle (24), buck lure will not leak out until preset time on clock (20) has arrived and needle (24) is lifted from seat (25).

Fill plug (29) on back of lure dispenser (12) offers as a place to add the buck lure and also serves as a vent for fluid receptacle (13).

Having therefore disclosed the subject matter of this invention, it should be apparent that various changes may be made in the detailed construction. It is therefore understood that such changes will be within the breadth and scope of the present invention as is defined by the appended claims.

I claim:

1. A buck lure dispensing device for periodically dispensing a fluid animal scent, said device comprising: a hollow housing, means for supporting said housing in an elevated position above the ground, said means for supporting connected to said housing, a reservoir contained at least partially within said housing for containing said animal scent, a valve means for controlling flow of said animal scent out of said reservoir, and a timer within said housing, said timer for controlling said valve means;

said valve means comprising a needle, said needle including a first end and a second end, said fist end positioned above said reservoir and said second end including a seal and positioned adjacent an aperture at the bottom of said reservoir, said valve means further comprising a control means for intermittently raising and lowering said needle, said control means acting in response to said timer, said control means connected to said first end, said device further comprising a tube extending from the bottom of said reservoir, and an absorbent wick mounted adjacent a lowermost distal end of said tube, whereby said timer activates said control means, and said control means positions said needle so as to allow said animal scent to flow from said reservoir into said tube to said wick, so as to allow gradual emission of said animal scent into the surrounding air and upon the ground below said device.

2. A buck lure dispensing device as recited in claim 1, further including a fluid level gauge, said gauge in fluid connection with said reservoir adjacent said bottom of said reservoir, whereby the quantity of fluid contained in the reservoir can be ascertained.

3. A buck lure dispensing device as recited in claim 1 wherein said timer comprises a rotatable clock and a switch activated by said clock, wherein said control means acts in response to said switch.

4. A buck lure dispensing device as recited in claim 3 wherein said control means is a solenoid.

5. A buck lure dispensing device as recited in claim 3 wherein magnetic indicators are mounted on said rotatable clock and said switch comprises contacts, said contacts opening and closing in response to the position of said magnetic indicators so as to activate said control means.

6. A buck lure dispensing device as recited in claim 3 wherein said rotatable clock displays 24 hour increments.

* * * * *